Patented Nov. 7, 1922.

1,434,764

UNITED STATES PATENT OFFICE.

GEORGE ALTSTÄDTER, OF VIENNA, AUSTRIA.

TIRE-HEALING COMPOSITION.

No Drawing.   Application filed June 27, 1921.   Serial No. 480,826.

*To all whom it may concern:*

Be it known that I, GEORGE ALTSTÄDTER, a citizen of the Republic of Austria, residing at Vienna, Austria, have invented certain new and useful Improvements in a Tire-Healing Composition, of which the following is a specification.

The object of this invention is to provide for the automatic closing up of holes or perforations produced by injuring pneumatic tires of cycles, automobiles or the like by means of a composition introduced into its inner tube which, when the latter is injured, becomes solidified when escaping and thereby closes up the hole or perforation. Various compositions have already been proposed for this purpose. Many of these contain an adhesive, either of vegetable origin, such as dextrine, different kinds of gum, vegetable mucilage or the like, or of animal origin such as glue, casein or the like, or a readily solidifying inorganic body acting as a cement such as water glass (alkali silicate) or the like. Frequently for thickening the said adhesive or for giving it "body," a mineral filling material for instance silica, talc or another silicate is added, usually in a finely comminuted state. Additions of hygroscopic substances more particularly of magnesium chloride are also sometimes made, these being designed to prevent the stopper formed from becoming brittle. Glycerin serves the same purpose. There are also sometimes added, sulphur, pentasulphide of antimony, or preserving agents for rubber such as tannin, salicylic acid, boric acid.

Some of these prior compositions are of little utility, because they attack the rubber. Others attain the object in view more or less imperfectly. None of these are wholly reliable.

The present invention starts from one of the known mixtures, preserving agents being added thereto, it being a condition that a fermentable derivative of starch, for instance dextrine, is present in the mixture. According to the present invention the fermentable constituent of the composition is caused to begin fermenting, either spontaneously or fermentation is initiated or set up by implanting suitable micro-organisms, for instance in the case of dextrine, by the addition of some species of yeast capable of causing dextrine to ferment. Such a composition in the state of fermentation offers the advantage over sealing compositions of the same class heretofore proposed in that it remains in a thinly liquid state for a long time so that in case of a puncture in the inner tube of a pneumatic it readily starts to flow out through such puncture. Owing to the escape of the carbon dioxide produced by the fermentation and contained in the liquid the surface of the plug formed by the liquid is increased, so that the escaping liquid solidifies rapidly. As contradistinguished therefrom, the compositions heretofore used become so viscous after some time that they flow out through the puncture only very slowly, a good deal of air escaping at the same time, and eventually they do not seal the puncture at all because the plug which solidifies only slowly cannot completely fill up the perforation or puncture, as the air rushes through the same too violently. A further advantage secured by the fermentation is that when owing to a puncture a slight reduction of the pressure in the inner tube takes place, this is compensated for (to some extent at least) by the carbon dioxide formed by fermentation.

Tests have shown that by the use of my composition, holes or perforations if not too large, are regularly and certainly repaired and the inner tube after such automatic closing up, even of numerous holes or perforations, still retains its efficiency.

Preferably the fermentation is initiated before the compound is introduced or pumped into the inner tube, this being preferably effected in the presence of a substance retarding fermentation, for regulating and limiting the consumption of the fermentable constituent during this preliminary treatment. It has been found advantageous to introduce the liquid, in which fermentation has commenced, into closed vessels and to permit fermentation to continue therein, whereby the pressure increases gradually; and the composition increases in volume. In this way a mixture is obtained ready for use, which may be directly filled from the bottles into the inner tube. Preferably two litres of the fermenting mixture are introduced into the inner tube of an ordinary sized automobile tire, before pumping it up.

The following is an example of carrying into practice the above invention; 250 parts by weight of dextrine, 50 parts by weight of tripoli and 170 parts by weight of kaolin are triturated in a dry state and carefully agitated after the addition of 600 parts by weight of water, whereupon 10 parts by weight of vegetable gum and a small quantity of a solution of benzoin gum is added. The mixture is left to stand at room temperature, preferably after implanting into the same a species of yeast capable of causing dextrine to ferment, until fermentation is set up and then it is filled into pressure bottles and fermentation is permitted to continue with the exclusion of air. It is then ready to be run into the inner tubes.

I claim:—

1. The step of introducing into the inner tube of a pneumatic tire, the herein described composition of matter consisting of a liquid adhesive mixture which will solidify upon being forced out through a puncture or perforation of the inner tube, such composition containing a fermentable constituent in a state of fermentation.

2. As a new article of manufacture a puncture-closing composition to be filled into the inner tubes of pneumatics consisting of a liquid adhesive mixture which solidifies on being forced out through a puncture or perforation of the inner tube, containing as a fermentable constituent in the state of fermentation and a fermentation retarding agent.

3. As a new article of manufacture a puncture-closing composition to be filled into the inner tubes of pneumatics consisting of a liquid adhesive mixture which solidifies on being forced out through a puncture or perforation of the inner tube, containing a fermentable derivative of starch in the state of fermentation, and a fermentation retarding agent.

4. As a new article of manufacture a puncture-closing composition to be filled into the inner tubes of pneumatics consisting of a liquid adhesive mixture which solidifies on being forced out through a puncture or perforation of the inner tube, containing dextrine in the state of fermentation, and a fermentation retarding agent.

5. As a new article of manufacture a puncture-closing composition to be filled into the inner tubes of pneumatics consisting of a liquid adhesive which solidifies on being forced out through a puncture or perforation of the inner tube, containing a fermentable constituent in the state of fermentation, and a fermentation retarding agent, the said mixture being contained in a closed vessel under pressure.

In testimony whereof I have affixed my signature.

GEORGE ALTSTÄDTER.